United States Patent
Severinsson et al.

(10) Patent No.: US 6,705,437 B2
(45) Date of Patent: Mar. 16, 2004

(54) DISC BRAKE

(75) Inventors: Lars Severinsson, Hishult (SE); Håkan Larsson, Billeberga (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/323,049

(22) Filed: Dec. 18, 2002

(65) Prior Publication Data

US 2003/0127290 A1 Jul. 10, 2003

Related U.S. Application Data

(63) Continuation of application No. PCT/EP01/06947, filed on Jun. 20, 2001.

(51) Int. Cl.[7] ............................................. F16D 55/00
(52) U.S. Cl. ............................. 188/73.32; 188/73.37; 188/71.1; 188/71.5; 188/73.45
(58) Field of Search ........................ 188/73.32, 73.36, 188/73.37, 73.38, 71.5, 18 A, 73.45, 218 A, 70 R; 192/70.17, 70.2

(56) References Cited

U.S. PATENT DOCUMENTS

| | | | | |
|---|---|---|---|---|
| 3,243,017 A | * | 3/1966 | Kleinstuck | 188/72.3 |
| 3,841,444 A | * | 10/1974 | Baum et al. | 188/72.3 |
| 4,086,986 A | * | 5/1978 | Haraikawa | 188/73.45 |
| 4,529,067 A | | 7/1985 | Scott | 188/18 A |
| 4,573,554 A | * | 3/1986 | Ritsema | 188/73.38 |
| 4,576,255 A | | 3/1986 | Méry et al. | 188/71.5 |
| 4,605,103 A | * | 8/1986 | Carre et al. | 188/71.5 |
| 4,749,066 A | * | 6/1988 | Garrett et al. | 188/73.32 |
| 4,865,160 A | | 9/1989 | Casey | 188/18 A |
| 6,298,953 B1 | * | 10/2001 | Bunker | 188/71.1 |
| 6,305,510 B1 | * | 10/2001 | Bunker | 188/218 XL |

FOREIGN PATENT DOCUMENTS

| | | | |
|---|---|---|---|
| DE | 198 04 426 | | 7/1999 |
| FR | 2.056.625 | | 4/1971 |
| GB | 2 004 008 A | * | 9/1978 |
| GB | 2 049 845 | | 12/1980 |
| GB | 2 074 262 A | * | 4/1981 |
| GB | 2 320 300 | | 6/1998 |
| JP | 59026631 | | 2/1984 |
| JP | 61112833 | | 5/1986 |

* cited by examiner

*Primary Examiner*—Jack Lavinder
*Assistant Examiner*—Mariano Sy
(74) *Attorney, Agent, or Firm*—St. Onge Steward Johnston & Reens, LLC

(57) ABSTRACT

The present invention concerns a disc brake mainly for road vehicles. The disc brake comprises a fixed caliper straddling one or more brake discs, one or more thrust plates and a number of brake pads. The brake discs are received in a non-rotating but axially moveable relationship on a rotating hub. The brake pads are guided axially moveable in the caliper taking up the load of the brake pads.

14 Claims, 8 Drawing Sheets

DISC BRAKE

This application is a continuation of pending International Patent Application No. PCT/EP01/06947 filed on Jun. 20, 2001, which designates the United States and claims priority of pending Swedish Application No. 0002316-8 filed on Jun. 21, 2000.

FIELD OF THE INVENTION

The present invention concerns a disc brake having a fixed caliper and one or more axially movable brake discs.

It is previously known to arrange one or more brake discs of a disc brake moveable in an axial direction. Both the brake discs and the brake pads are moveable by means of a thrust plate or the like. By having a number of brake discs in stead of a single brake disc the braking force of each brake disc will be reduced. Thus, the maintenance of the disc brake may be reduced.

SUMMARY OF THE INVENTION

One object of the present invention is to reduce the thermal stress and wear of the brake discs and brake pads and thus reduce the frequency of replacement of these parts.

A second object of the present invention is to reduce the risk for cracks in the brake discs by reducing the thermal stress in these parts.

A third object of the present invention is to enable vehicle manufacturers to use one size of disc brake for different wheel sizes without thermal overloading of the brakes.

A further object of the present invention is to eliminate or at least reduce the noise generation and wear of the connection between the hub and each disc.

The above object is achieved by means of a disc brake where the brake pads are guided axially moveable in the brake caliper taking up the load of the brake pads.

Further objects and advantages of the invention will be obvious for a person skilled in the art from reading the detailed description below of preferred embodiments of the invention.

DETAILED DESCRIPTION OF PREFERRED EMBODIMENTS

Figure 1:
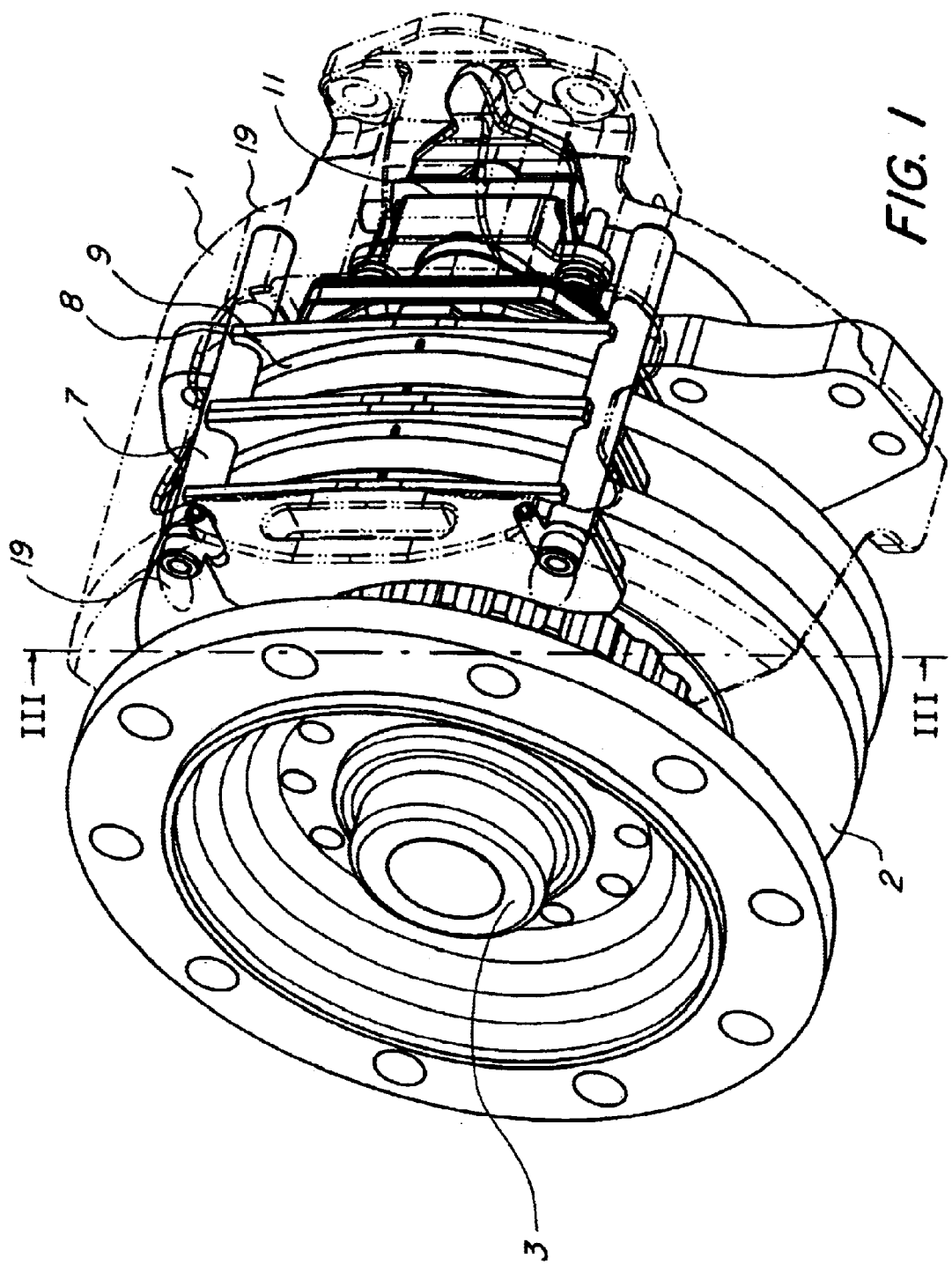
FIG. 1 is a perspective view of a disc brake according to the invention.

The disc brake of the invention comprises a fixed caliper 1, shown in phantom in FIG. 1 for clearness. The caliper 1 straddles one or more axially moveable brake discs 2. Brake pads 8 are arranged on both sides of each brake disc 2. Each brake pad 8 comprises a support 9 carrying a brake lining on one or both sides. Each brake pad 8 is to act on one brake disc 2 when the brake is activated. The brake discs 2 are received on a rotating hub 3. The brake discs 2 are carried axially moveable but non-rotatable in relation to the hub 3.

In this description the expressions "axial" and "radial" and similar expressions are in reference to the axis of the hub 3.

The brake discs 2 and the brake pads 8 are moved axially on the hub 3 by means of a thrust plate 6. In other embodiments (not shown) the single thrust plate is replaced with two or more thrust plates or the like. Whereby each thrust plate normally is actuated by means of a single thrust unit each.

The brake pads 8 placed between the brake discs 2 are in one embodiment formed of a single support 9 having brake linings on both sides of the support 9.

In the upper part of the caliper 1 an opening 18 is provided. The brake pads 8 are inserted and removed via the opening 18 of the caliper 1. In the caliper 1 two guide pins 7 are arranged essentially perpendicular to the disc(s) 2 in longitudinal grooves 19. The guide pins are removably attached to the caliper 1 by means of locking pins 20 or any other suitable fastening means.

The supports 9 of the brake pads 8 have circular recesses 12 at the upper corners. The recesses 12 have the form of semicircles. In other embodiments (not shown) the recesses have other cross-section forms adapted to the form of the pins 7, e.g. oval, rectangular, polygonal etc. The recesses 12 of the brake pads 8 interact with the guide pins 7. The thrust plate 6 may be furnished with recesses (not shown) at the upper corners. Also the recesses 11 of the thrust plate 6 interact with the guide pins 7. The brake pads 8 are fixed to the caliper 1 by means of the guide pins 7 and the recesses 11 and may only move in an axial direction. The lower edges of the thrust plate 6 and the brake pads 8 are placed at a distance from the hub 3. Thus there is a gap between the hub 3 and the thrust plate 6 and brake pads 8, respectively.

When the brake pads 8 are to be replaced the locking pins 20 fixing the guide pins 7 to the caliper 1 are loosened. Then the guide pins 7 are drawn out of the grooves 19, whereby the brake pads may be lifted out of the caliper 1. The new brake pads 8 are brought down through the opening 18 of the caliper 1. The guide pins 7 are then reinserted in the grooves 19, whereby the recesses 12 of the brake pads 8 are to be positioned to receive the guide pins 7. Finally, the guide pins 7 are fixed to the caliper 1 by means of the locking pins or the like.

Thus, the brake pads 8 are arranged moveable in an axial direction on the guide pins 7.

In an alternative arrangement (not shown) the guide pins are replaced by abutments formed in the brake caliper 1. The brake pads 8 and possibly the thrust plate(s) 6 will be guided on the abutments. The support 9 of the brake pads 8 has a recess for interaction with the abutments. The form of the recesses is adapted to the form of the abutments. In order to be able to insert and remove the brake pads 8 slots are formed in the caliper 1 in or adjacent the abutments.

Figure 2:
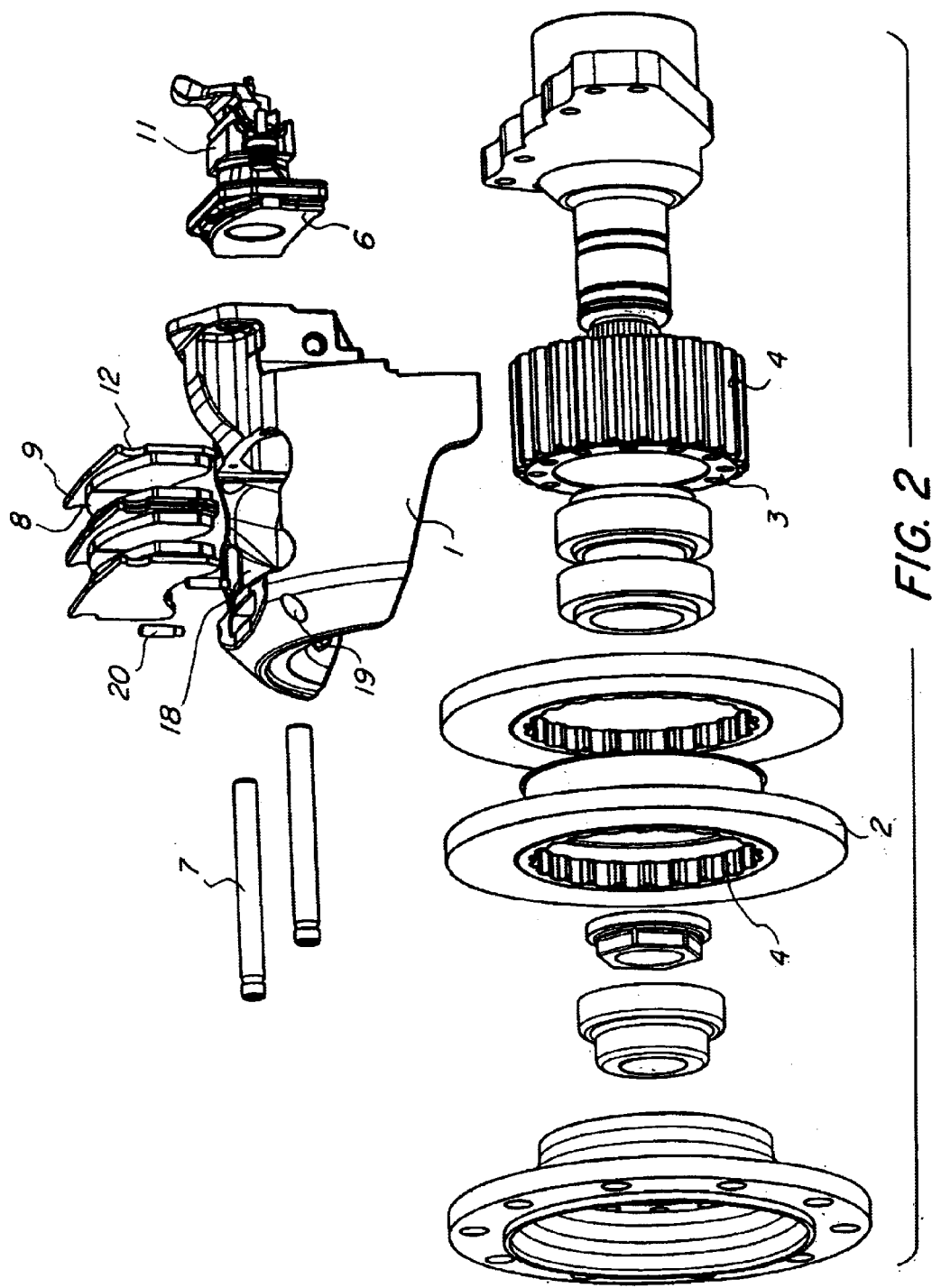
FIG. 2 is an exploded view of the disc brake of FIG. 1.
Figure 3:
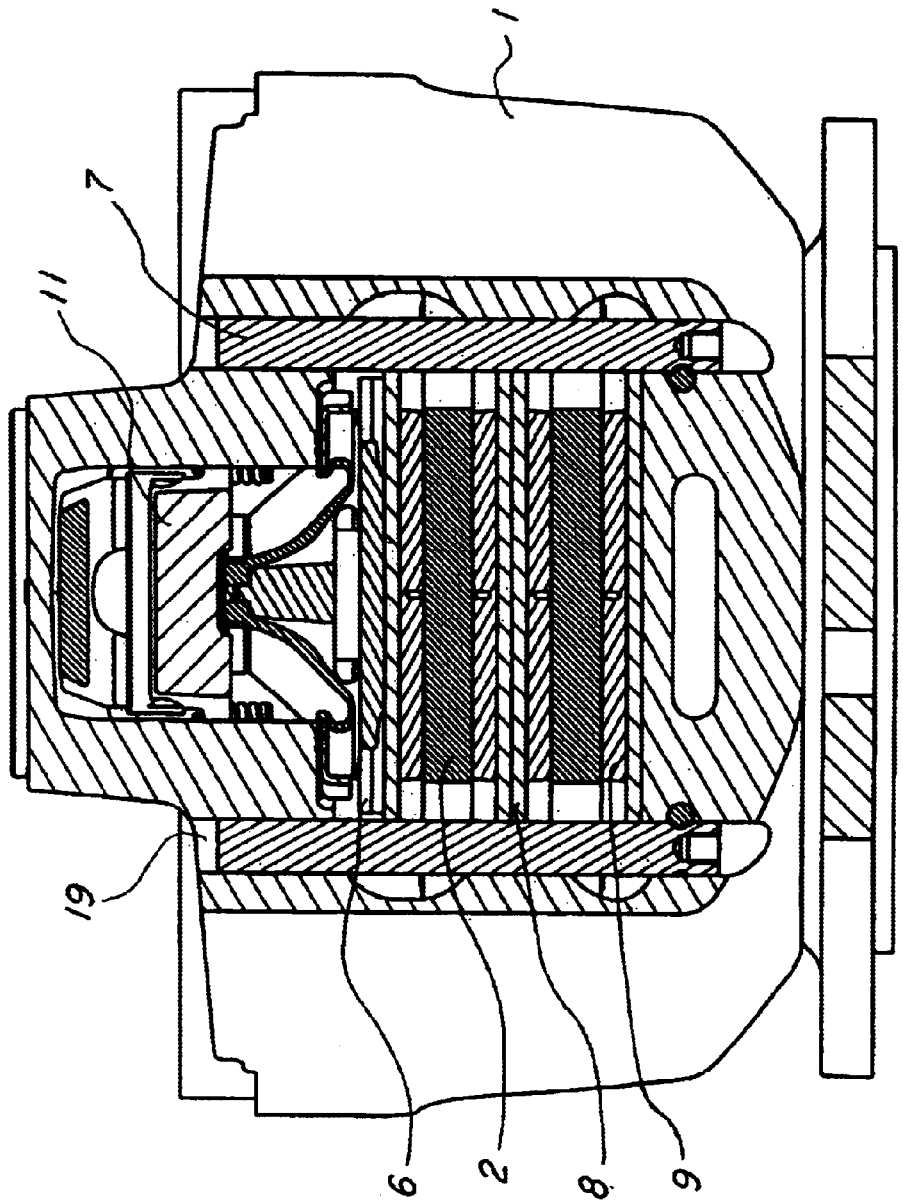
FIG. 3 is a cross section view taken along the lines III—III of FIG. 1.

As stated above the brake discs 2 are received on the hub 3. During motion of the vehicle the hub 3 will rotate. The connection between the hub 3 and the brake discs 2 has the form of splines 4 in a first embodiment as shown in FIGS. 1 to 3. The splines 4 allow axial movement for the brake discs 2 but transfer the rotational movement of the hub 3 to the brake discs 2.

The surfaces of the splines may be treated and/or coated to withstand wear and reduce friction in the connection between the hub 3 and the brake discs 2.

Figure 4:
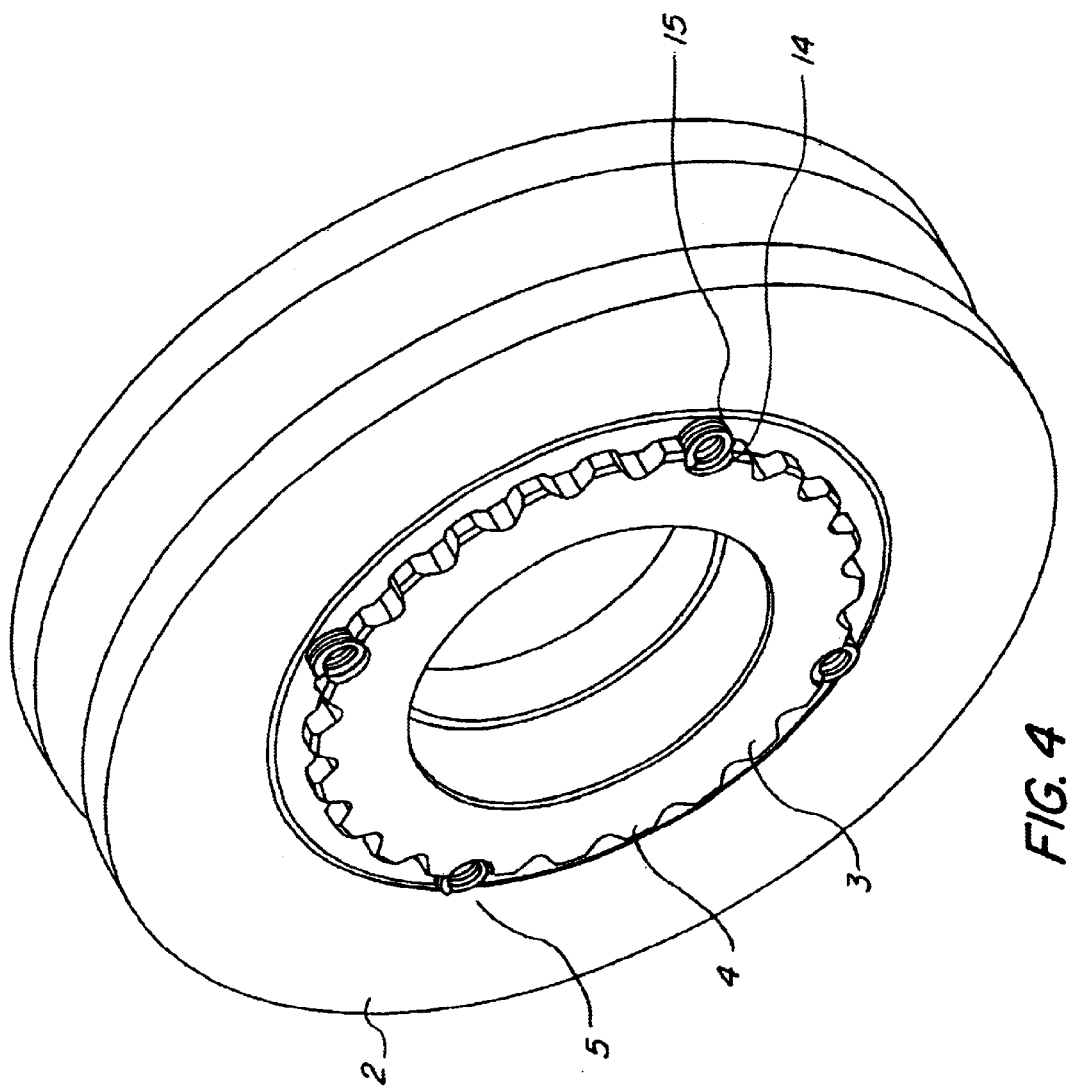
FIGS. 4, 5a and 5b show a second embodiment of the connection between the brake discs and the hub of the disc brake.
Figures 5A, 5B:
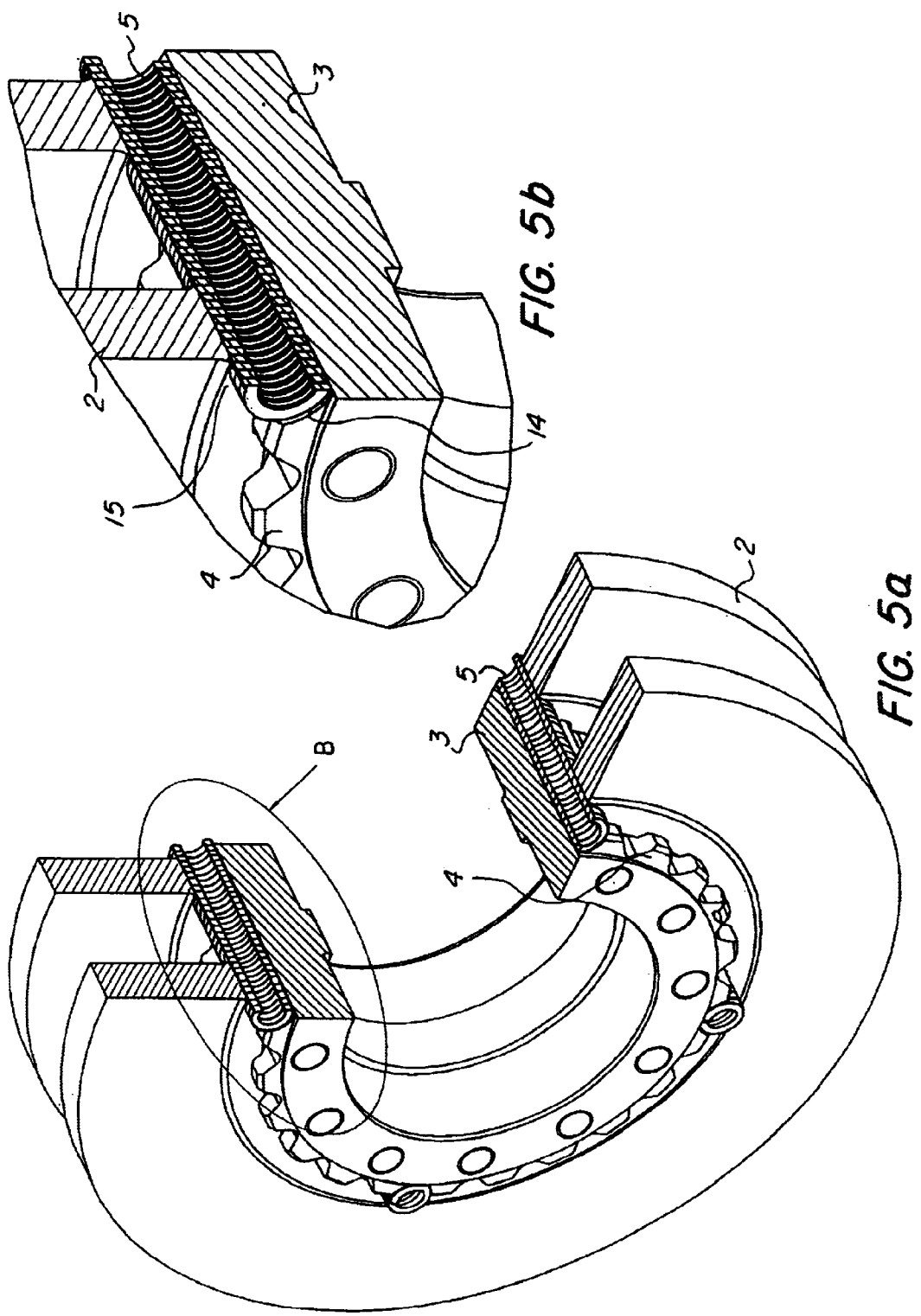

In a second embodiment, shown in FIGS. 4 and 5, the connection between the hub 3 and the brake discs 2 is a combination of splines 4 and springs 5. The springs 5 are received in recesses 14, 15 of the hub 3 and brake discs 2, respectively. The recesses 14, 15 of the hub 3 and discs 2 have the cross-section form of a semicircle. The recesses 14, 15 are placed adjacent each other to form a circular cylinder to receive the springs 5. The springs 5 will allow axial movement for the brake discs 2 in relation to the hub 3 and transfer the rotational movement of the hub 3 to the discs 2. In FIGS. 4 and 5 four springs 5 are shown in the connection between the hub 3 and the discs 2. A person skilled in the art will realise that other numbers of springs 5 may be used. However, at least three springs should be used, giving a partition of 120°.

Figure 7B:
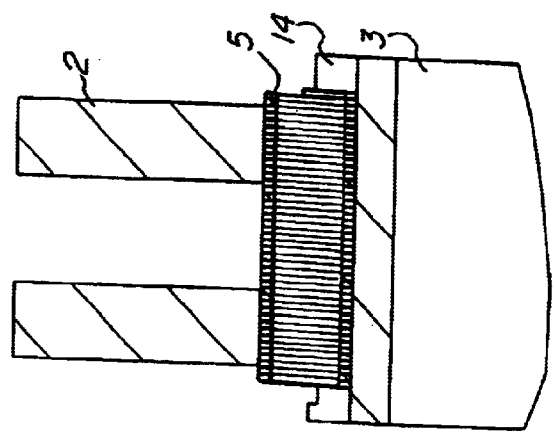
FIGS. 6, 7a and 7b show a third embodiment of the connection between the brake disc and the hub of the disc brake.
Figure 7A:
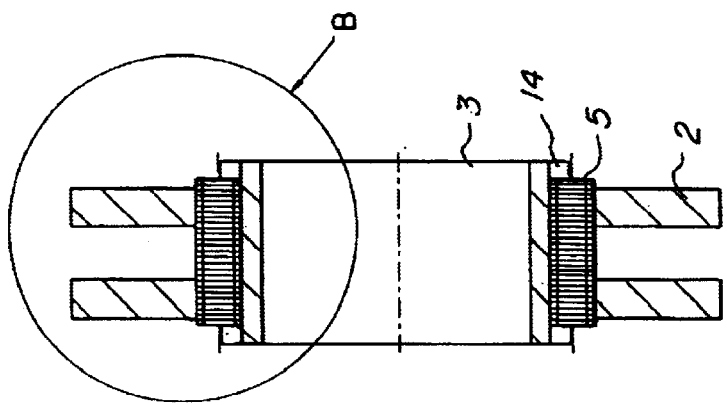
Figure 6:
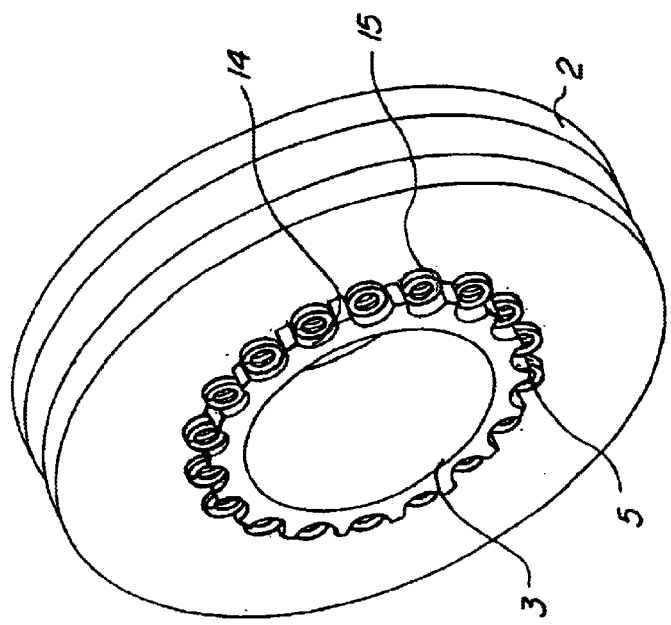

When only a small or no braking torque is transferred the springs 5 will centre each disc 2 in order to avoid contact with the splines 4 of the hub 3. As the braking torque increases the springs 5 will be elastically deformed in radial direction, whereby the splines 4 transfer the braking torque. The purpose of the centering of the disc 2 by means of the springs 5 is to avoid noise and wear when the disc 2 rotates unloaded In a third embodiment, shown in FIGS. 6 and 7, the connection between the hub 3 and the brake discs 2 has the form of springs 5 and no splines are used. As for the second embodiment the springs 5 are received in circular cylinders formed by recesses 14, 15 of the hub 3 and brake discs 2, respectively. When no braking torque is transferred the discs 2 may be moved axially by sliding on the springs 5. Due to e.g. elasticity of the brake caliper 1 there is a need for a certain axial movement of the discs 2 also during torque transfer. By using the elastic characteristics of the springs 5 in axial direction this axial movement may be accomplished without sliding, which is beneficial to reduce wear. Also in this case the springs 5 will centre the discs 2 and thus avoid noise and wear when the discs 2 rotate unloaded.

In a variant of the last embodiment some of the springs are somewhat bigger and less stiff than the rest of the springs.

To protect the connection between the hub 3 and the brake discs 2 protection devices are placed in the gap between the hub and the brake pads 8. Axially the protection devices are placed between the brake discs 2 and also on the outside of each disc 2. The protection devices should protect against road dirt and possibly heat radiation.

Figure 8:
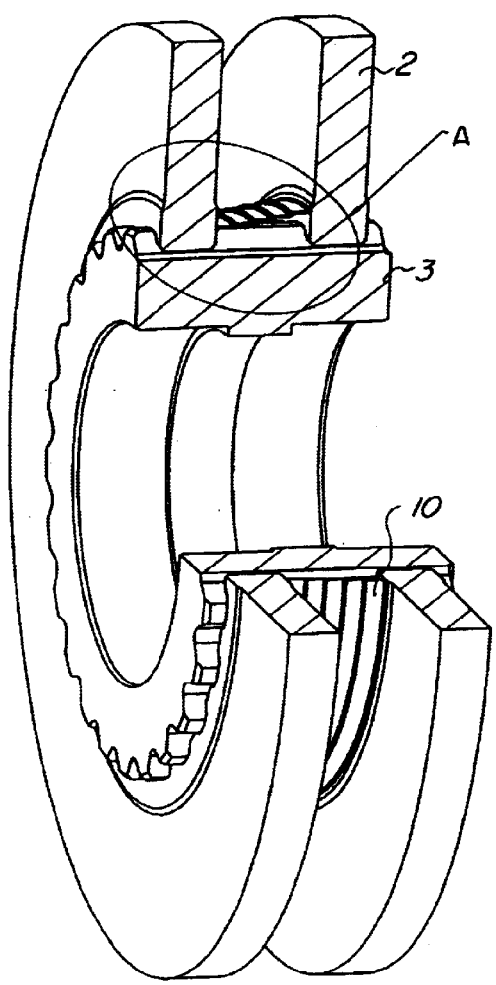
FIGS. 8 to 11 shows different alternatives for a protection device.
Figure 9:
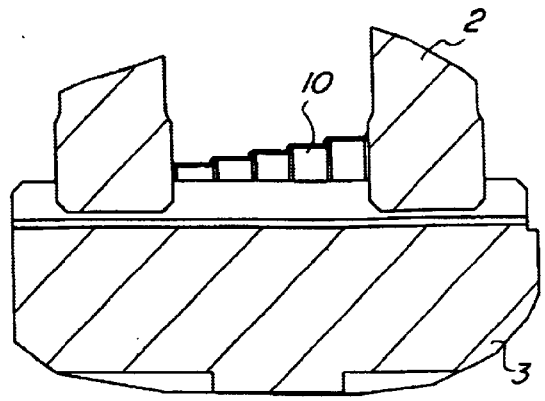
Figure 10:
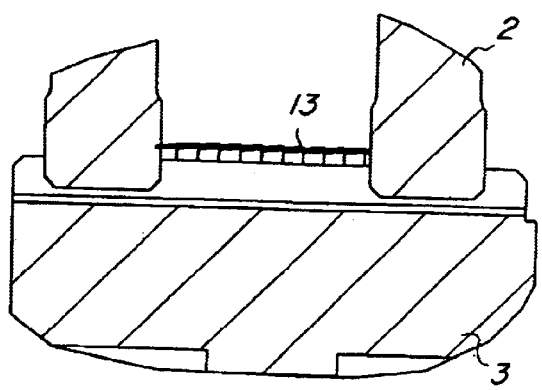
Figure 11:
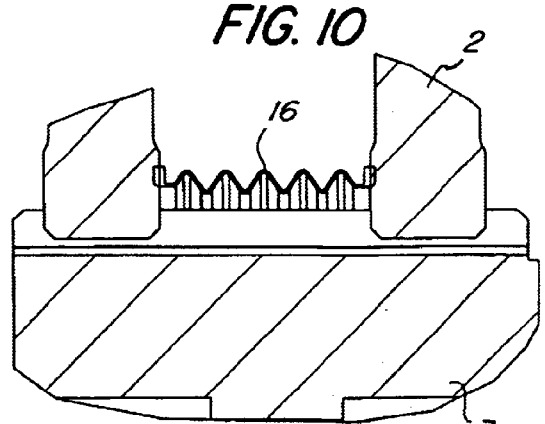

In FIG. 8 the placement of the protection device is shown schematically. A person skilled in the art realises that the protection device may have many different forms. In the FIGS. 9 to 11 three different embodiments of the protection device are shown enlarged in the area A of FIG. 8.

In a first embodiment (FIG. 9) the protection device is a telescope tube 10 made of metal. The telescope tube 10 is elastic in axial direction and will be compressed when the distance between the discs 2 is reduced. The ends of the telescope tube 10 are fixed to respective brake disc 2.

In a second embodiment (FIG. 10) the protection device is a metal spiral 13. The metal spiral 13 is made of a metal band that is wound to form the spiral 13. The spiral 13 is formed to be elastic in axial direction, i.e. perpendicular to the discs 2, and will be compressed when the distance between the discs 2 is reduced. Furthermore, the spirals 13 are biased axially to always fill up the distance between the discs 2 on the hub 3 and possibly outside of the discs 2.

In a third embodiment (FIG. 11) the protection device is a textile band 16. The ends of the textile band 16 are attached to the discs.

In a further embodiment (not shown) the protection device may be a combination of the telescope tube 10 or spiral 13 and the textile band 16. In which case the textile band 16 normally is placed inside the tube 10 or spiral 13, i.e. closest to the hub 3.

Figure 12B:
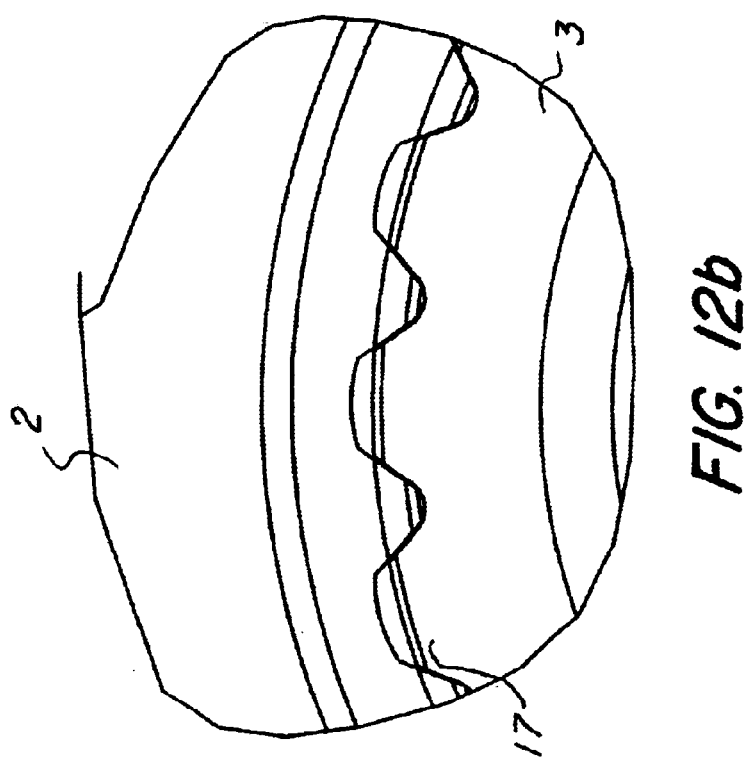
FIGS. 12a and 12b is a view of a truncated form of the splines according to one embodiment of the invention.
Figure 12A:
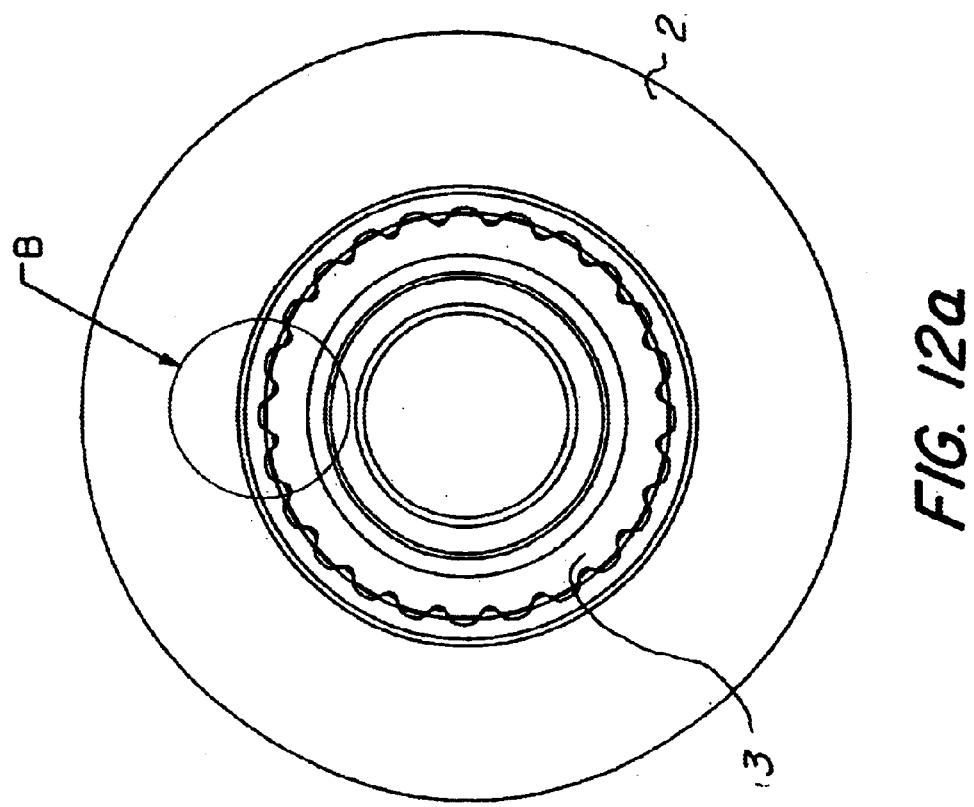

The protection means 10,13,16 will hinder that road dirt come in between the hub 3 and the brake discs 2. In order to reduce the heat transfer the splines 4 may have a truncated (cut-off) form as indicated in FIG. 12. The form of the truncated splines in FIG. 12 is only given as an example and a person skilled in the art realises that it may have many different forms. By the truncated form the physical contact between the brake discs 2 and the hub 3 is reduced and, thus, the heat transfer is reduced. This will of course only apply for the embodiments that encompass splines 4.

In use the disc brake will in normal way be actuated by means of a brake mechanism 11 actuated by an actuator (not shown), preferably a pneumatic actuator. In other embodiments a hydraulic or electrically actuator is used. As the actuating mechanism forms no part of the present invention it will not be described further here. One example for an actuating mechanism is indicated in FIGS. 1 to 3.

When the brake is activated the brake mechanism will move the thrust plate 6 or thrust plates in the direction towards the brake discs 2. In this movement the thrust plate 6 or plates will bring the brake pads 8 into contact with the brake disc 2. All the brake pads 8 and brake discs 2 will be moved by the thrust plate 6 or plates except possibly the last brake pad 8, i.e. the brake pad furthest from the thrust plate 6 or plates. When the brake pads 8 and the brake discs 2 come into contact the rotation of the hub 3 will be slowed down or stopped in normal way. This will in turn reduce the speed of the vehicle or stop it. The tangential load on the brake pads 8 will be taken up by the guide pins 7 received in the caliper 1.

A person skilled in the art realises that the number of brake discs may be varied without departing from the scope of the present invention as defined by the enclosed claims.

What is claimed is:

1. A disc brake mainly for road vehicles comprising a fixed caliper straddling one or more brake discs, one or more thrust plates and a number of brake pads, characterized in that the brake discs are received in a non-rotating but axially moveable relationship on a rotating hub by means of springs for transmitting braking torque from the brake disc to the hub, that the brake pads are guided axially moveable in the caliper taking up the load of the brake pads, and that the caliper has an opening through which the brake pads are inserted and removed.

2. The disc brake of claim 1, characterized in that the thrust plate(s) is guided on the guide pins, the pins removably fixed to the caliper, or abutments in the caliper.

3. The disc brake of claim 1, characterized in that the brake pads comprise supports having recesses for interaction with the guide pins or the abutments, and that the brake pads and the brake disc(s) are moved axially by means of the thrust plate(s).

4. The disc brake of claim 3, characterized in that all brake pads have identical form.

5. The disc brake of claim 3, characterized in that for at least one brake pad the support has brake lining on both sides.

6. The disc brake of claim 5, characterized in that two brake discs are provided.

7. The disc brake of claim 6, characterized in that the brake discs are received axially moveable on the hub by means of both splines and springs, wherein below a threshold braking torque, the braking torque is transmitted from the brake disc to the hub by the springs.

8. The disc brake of claim 7, characterized in that when a connection between the brake discs and the hub comprises both splines and springs, there are at least three springs.

9. The disc brake of claim 7, characterized in that the springs are coil springs placed in the axial direction of the brake disc(s) and the hub; that the springs are received in semicircular recesses of the hub and brake disc(s), respectively; and that the springs allow axial movement of the disc(s) but counteract radial movement of the disc(s).

10. The disc brake of claim 9, characterized in that protection devices are furnished at the hub axially between and outside the discs; that the protection devices are textile bands and/or metal tubes or spirals; and that the protection devices are biased in axial direction but does not hinder axial movement of the brake discs.

11. The disc brake of claim 10, characterized in that a mating surfaces of the disc(s) and/or the hub are treated to withstand wear and/or corrosion and that the brake is pneumatically, hydraulically or electrically actuated.

12. The disc brake of claim 11, characterized in that the splines are given a form to reduce the heat transfer between the brake discs and the hub.

13. The disc brake of claim 12, characterized in that the splines are truncated to reduce the heat transfer.

14. The disc brake of claim 7, wherein above the threshold braking torque, the braking torque is transmitted from the brake disc to the hub by the splines.

* * * * *